(No Model.) 2 Sheets—Sheet 1.

A. J. GASKING.
BELT FASTENER.

No. 496,255. Patented Apr. 25, 1893.

Witnesses
George Price
William Smith

Inventor.
Alfred John Gasking (No Model.)　　　　　A. J. GASKING.　　　2 Sheets—Sheet 2.
BELT FASTENER.
No. 496,255.　　　　　　　Patented Apr. 25, 1893.
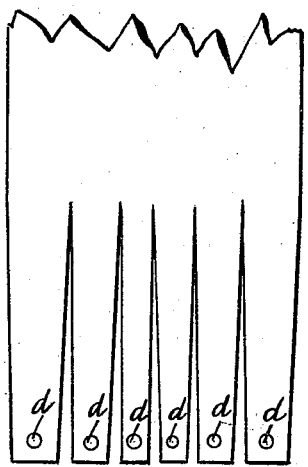
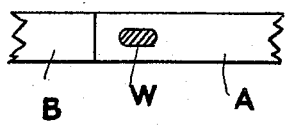
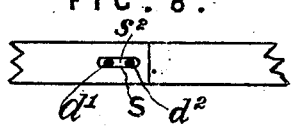
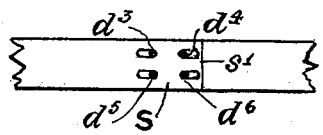
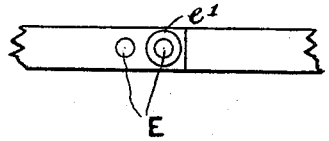
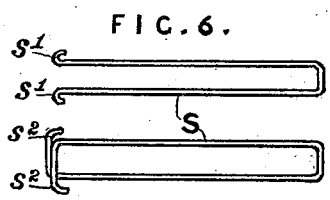
Witnesses
George Price
William Smith
Inventor
Alfred John Gasking
THE NORRIS PETERS CO., PHOTO-LITHO., WASHINGTON, D. C.

UNITED STATES PATENT OFFICE.

ALFRED JOHN GASKING, OF LONDON, ENGLAND.

BELT-FASTENER.

SPECIFICATION forming part of Letters Patent No. 496,255, dated April 25, 1893.

Application filed June 9, 1892. Serial No. 436,114. (No model.) Patented in England April 20, 1892, No. 7,467.

*To all whom it may concern:*

Be it known that I, ALFRED JOHN GASKING, driving-belt manufacturer, a subject of Great Britain, residing at Beech Lodge, the Ridgeway, Enfield, London, in the county of Middlesex, England, have invented certain new and useful Improvements in Driving-Belts Applicable to other Purposes, (for which I have obtained a patent in Great Britain, No. 7,467, dated April 20, 1892,) of which the following is a specification.

My invention relates to an improved means for joining together the ends of bands or pieces of leather in such manner that they are adapted to run over wheels or pulleys having a curved or convex surface.

To such end my invention consists in the novel construction, combination and arrangement of parts hereinafter described and claimed, reference being made to the accompanying drawings, in which—

Figure 1:
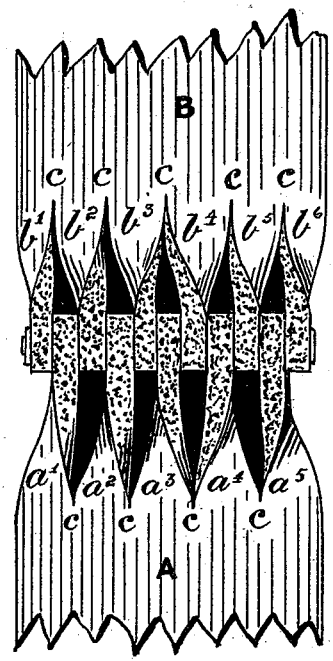
Figure 5:
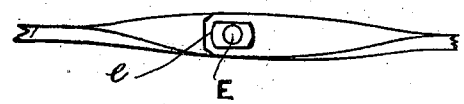
Figure 2:
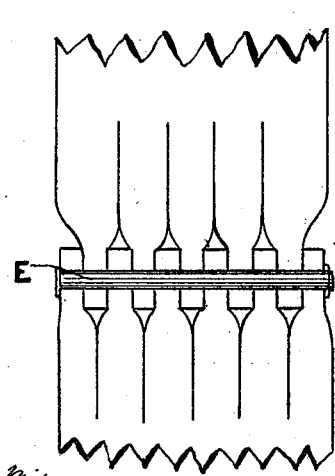
Figure 3:
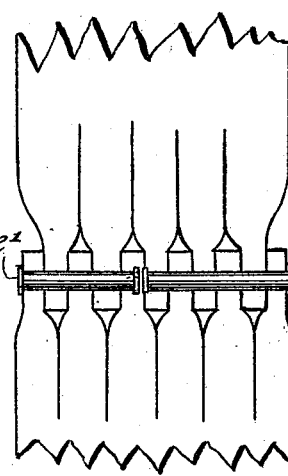
Figure 4:
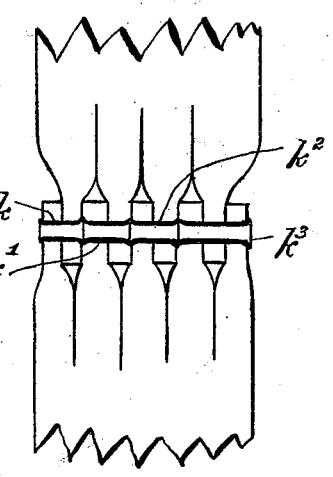

Figure 1, is a face view of the meeting ends of a band or two pieces of leather joined according to my invention. Fig. 2, is a sectional view of the joint, one fastening pin being used. Fig. 3, is a similar view, two fastening pins being used. Fig. 4, is a like view showing a modified construction of fastening device. Fig. 5, is an edge view of the construction shown in Fig. 1. Fig. 6, illustrates modified constructions of fastening devices. Fig. 7, is an edge view of the meeting ends secured together by a different fastening device. Fig. 8, is a similar view showing the ends fastened together by one of the devices illustrated in Fig. 6. Fig. 9, is a like view showing the ends fastened together by two of the devices illustrated in Fig. 6. Fig. 10, is an edge view showing the ends fastened together by two solid pins arranged side by side. Fig. 11, is a face view of the end of a piece of material slitted according to my invention, and Fig. 12, is a cross section thereof.

In the said drawings the letters A, B, designate the meeting ends of a band or pieces of leather or other material to be joined. These ends are slitted or cut to the points $c$, $c$, &c., as shown in Fig. 1, to form tongues $a'$, $a^2$, $a^3$, $a^4$, $a^5$, and $b'$, $b^2$, $b^3$, $b^4$, $b^5$, the end tongues being widest and the intermediate ones gradually decreasing in width to the center, as shown in Fig. 11, whereby the joined ends will have a cross sectional shape illustrated in Fig. 12, so that it is adapted to conform to the shape of a curved or convex-faced wheel or pulley. The tongues $a'$, &c., and $b'$, &c., are preferably cut V-shaped as shown in Fig. 11, to lessen the thickness of the joint at the meeting ends of the material. At the outer extremities of the tongues $a'$, &c., and $b'$, &c., I provide holes $d$ which may be formed in any suitable manner to receive the fastening devices. When the ends of the material are slitted as described, the tongues are turned at right angles to the face of the band or devices to be joined and they may be all turned in the same direction or alternately in opposite directions as may be desired. When the tongues on the ends of each piece or each end of the band are so turned at right angles the tongues are made to intermesh or interlock so that the holes $d$ will be in register, and the locking pins E passed through the holes $d$ as shown in Fig. 2, and the ends of the pieces or band thus securely locked together.

Instead of employing one pin as illustrated in Fig. 2, I may employ two pins $e'$, $e^2$, as shown in Fig. 3, said pins passing through the tongues in a common line or I may employ the modified construction of fastening devices $k$, $k'$ $k^2$ shown in Fig. 4, said devices consisting of short tubular pieces of metal.

In Fig. 6, I have illustrated a modified construction of fastening device which consists of a U-shaped pin S, the free ends of which are provided with hook like curved portions $S'$, $S^2$. In Fig. 8 one of these pins is shown in position fastening the ends of the material together, two holes $d'$ $d^2$, being provided in this case, and in Fig. 9, two of said pins are shown fastening the ends together, in which case four holes $d^3$, $d^4$, $d^5$, $d^6$ are provided.

In Fig. 7, I have shown the ends of the material joined together by a single oblong-shaped fastening pin W, and in Fig. 10, I have shown the ends fastened together by two cylindrical pins E, a washer $e$ being interposed between the head of the pin and the edge of the material.

An advantage attends the employment of a plurality of fastening devices, in that should one of them break, the other or others will serve to preserve the fastening.

It will be seen by my invention that I provide a novel manner of fastening together the ends of a band or pieces of leather or other material, so that the joint between the ends is made to conform to the contour of the curved face wheel or pulley.

Having thus described my invention, what I claim is—

The combination with a band or pieces of leather or other material, of tongues formed on the ends thereof, the outer tongues being wider than the middle ones and all of said tongues being turned to stand at an angle to the face of the article, and a fastening device passing through said tongues, substantially as described.

In testimony that I claim the foregoing as my own I affix my name in the presence of two witnesses.

ALFRED JOHN GASKING.

Witnesses:
LEWIS WM. GOOLD,
GEORGE PRICE.